May 26, 1959     R. J. LEAMAN ET AL     2,888,126

CONVEYOR APPARATUS

Filed Jan. 10, 1955     3 Sheets-Sheet 1

INVENTORS
RAYMOND J. LEAMAN
HARRY FEIGE
BY *Learman & Learman*
ATTORNEYS

INVENTORS
RAYMOND J. LEAMAN
HARRY FEIGE
BY Learman & Learman
ATTORNEYS

May 26, 1959  R. J. LEAMAN ET AL  2,888,126
CONVEYOR APPARATUS
Filed Jan. 10, 1955  3 Sheets-Sheet 3
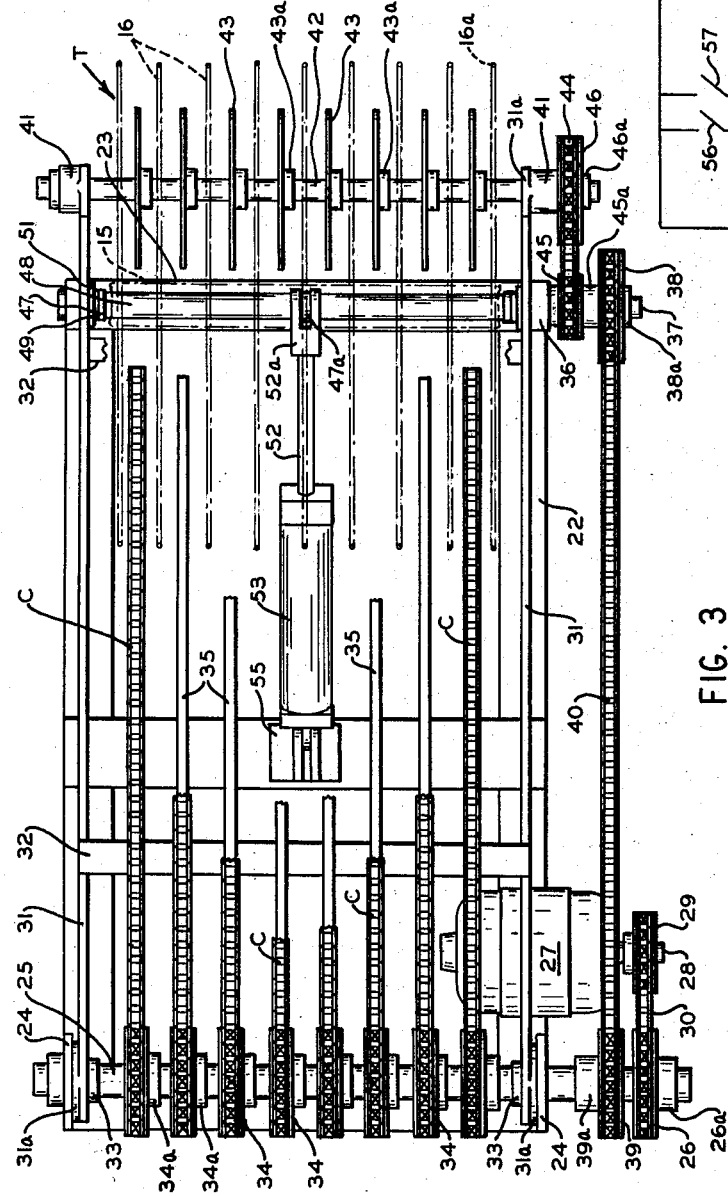
INVENTORS
RAYMOND J. LEAMAN
HARRY FEIGE
BY Harman & Harman
ATTORNEYS

United States Patent Office 2,888,126
Patented May 26, 1959

2,888,126

CONVEYOR APPARATUS

Raymond J. Leaman and Harry Feige, Saginaw, Mich., assignors to Baker Perkins Inc., Saginaw, Mich., a corporation of New York Application January 10, 1955, Serial No. 480,749

12 Claims. (Cl. 198—27)

This invention relates to conveyor apparatus and more particularly to stripping apparatus and conveyor trays from which the apparatus is designed to remove articles such as pan sets and the like.

In the baking industry, a number of individual pans are commonly strapped in spaced-apart, aligned relation and it is these pan sets which are processed through the bakery as units. During the proofing and baking operations it is, of course, important that the dough in the pans have a maximum exposure to the carefully controlled atmospheres of the proofer and oven and accordingly, it is highly desirable that there be a maximum circulation of air around the individual pans in the sets. For this reason we have designed a grid type conveyor tray for transporting pan sets through an oven or proofer and devised stripping apparatus for removing the pan sets from these trays as they move past the mouth of the oven.

Briefly, the invention contemplates a grid-type tray having transversely spaced, pan-carrying, parallel bars arranged in the general longitudinal plane of travel of the oven or proofer conveyor and stripping apparatus comprising transversely spaced, longitudinally moving elements arranged to be moved between said bars to strip the pan sets therefrom and transport them from the oven or proofer.

One of the prime objects of the invention is to provide apparatus of the type described wherein the bars of a grid tray may be rigidly connected by welding a transverse reinforcing member underneath the bars and the stripper mechanism includes elements adapted to be disposed on both sides of this reinforcing member when the stripper apparatus is moved into engagement with the pans so that both ends of each pan in the set are simultaneously engaged and lifted and the pan set cannot tilt and fall from the stripper elements.

Another object of the invention is to design apparatus as described wherein means may be provided on both sides of the trays to prevent the pan sets from slipping off the trays as they are moved through the oven without interfering with the operation of the stripper elements.

A further object of the invention is to design apparatus of this type which can handle cake pans or the like which may be less than an inch in thickness as easily as bread pans which are commonly of much greater depth.

Another object of the invention is to design apparatus of the type described which permits the oven or proofer conveyor to be continuously operated and requires no precision machined cams or the like to provide a sequence of operations or movements.

A further object of the invention is to design stripping apparatus which very gently removes the pan sets from the trays so as not to unduly jar or vibrate the dough pieces therein.

A further object of the invention is to design stripper apparatus which cannot be readily jammed by pan sets which may be improperly positioned on the trays of the oven conveyor.

Another object of the invention is to design stripping or unloading apparatus whose operation is clearly visible and which is accessible so that pan sets which for some reason are not discharging properly may be easily removed by the operator before they could jam and cause serious damage.

Still a further object of the invention is to provide apparatus of the type described which is of extremely simple and durable construction, which is effective and reliable in operation, and which is comparatively easy and inexpensive to manufacture.

In the drawings:

Fig. 3 is a plan view of the stripper apparatus only with the tray being unloaded illustrated in diagrammatic lines, portions of the transfer chains and their guides being broken away in the interests of clarity.

Fig. 4 is a schematic view illustrating the electrical control system for the apparatus shown and described.

Figure 1:
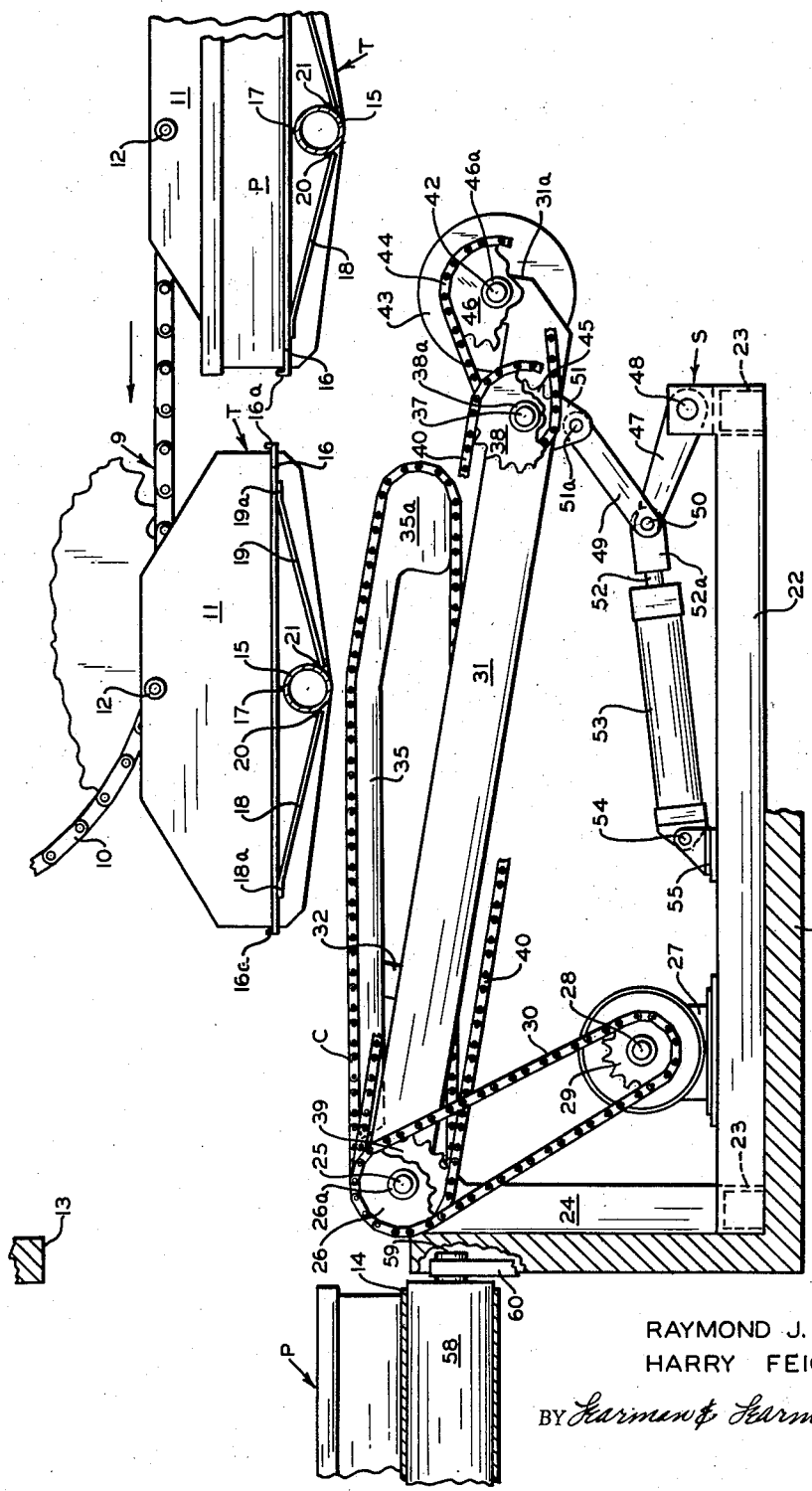
Fig. 1 is a side elevational view showing our grid type trays mounted on an oven conveyor or the like and depicting the stripper apparatus in inoperative position, portions of the drive chains and sprockets being broken away in the interests of clarity.

Referring now more particularly to the accompanying drawings wherein we have shown a preferred embodiment of our invention, a numeral 9 generally indicates a swing tray conveyor such as shown in Patent No. 2,634,693, issued April 14, 1953, to J. E. Pointon. Mounted between the transversely spaced, continuous chains 10 of the conveyor are trays T having end walls 11 which are preferably pivotally connected to the chains 10 as at 12. Clearly, the conveyor described could be employed in various types of ovens in proofers, and in other apparatus, however, for the sake of convenience, the conveyor shall be described as mounted within an oven O (Fig. 1) having an access opening or mouth 13. Further, of course, means other than the chains 10 which are shown moving from right to left could be employed to move the trays T in the indicated path of travel where practical.

Immediately after the pan sets P on the continuously moving trays T are unloaded to a transversely moving conveyor belt 14 by stripper or transfer apparatus which is generally designated S, they are reloaded with pans or proofed dough by loader mechanism which is disposed above the conveyor 14 and transfer apparatus S however, inasmuch as the loader elements form no part of the instant invention, they are not shown and their operation will not be described.

The end walls 11 of the trays T are rigidly connected by transverse shafts 15 as shown. Longitudinally extending, transversely spaced, parallel rods 16 for supporting the pan sets P are rigidly fixed to rods 17 carried by each shaft 15 and each of the rods 16 is connected by brace rods 18 and 19 to rods 20 and 21 respectively on the shafts 15 so that each tray comprises a plurality of individually braced pan supporting rods, the triangular construction providing the necessary rigidity and strength. The ends of the rods 18 and 19 are turned laterally as at 18a and 19a so that they may be readily tack-welded to the rods 16 and it is important to note that both ends of the rods 16 may be turned up as at 16a to prevent the pan sets P from slipping off the trays.

The stripper or transfer apparatus S which is arranged such that various elements thereof will be disposed in vertical alignment with the spaces between the rods 16 of the trays T as the latter pass overhead includes a frame comprising longitudinal rail members 22 connected by transverse frame members 23. Supported on the rear ends of the rails 22 are spaced-apart uprights 24 in which a shaft 25 is journaled as shown. The shaft 25 has a sprocket 26 on the one end thereof with its hub 26a fixed thereon and a motor 27 supported on the frame drives the shaft 25, the armature shaft 28 of the motor having a sprocket 29 thereon so that a chain 30 may drivingly connect the sprockets 26 and 29.

Upper longitudinal frame members 31 connected by transverse beams 32 and with them constituting an upper frame are supported on the ends of the shaft 25 but do not rotate with the shaft. The members 31 are provided with collars 31a which are loosely received on the shaft 25 and clearly the members 31 will be pivotal about the rotating shaft 25. Thrust collars 33 fixed to the shaft prevent lateral movement of the members 31 on the shaft. Also rigidly secured to the shaft 25 are the hubs 34a of sprockets 34 which as shown in Fig. 3 will be in longitudinal alignment with the spaces between the rods 16 of the trays as the latter travel toward the stripper apparatus. Elongated chain guides 35 rigidly supported on one of the beams 32 are provided in longitudinal alignment with the sprockets 34 and transfer chains C are trained around the sprockets and guides as shown. The guides 35 are inclined upwardly relative to the members 31, however, it will be observed that the front ends 35a thereof are formed so that their upper surfaces are substantially parallel with the members 31 for a purpose which will later become apparent. The guides 35 terminate at their rear ends adjacent the sprockets 34 and the front ends thereof are shaped so that the chains C may be trained around them as shown.

Figure 2:
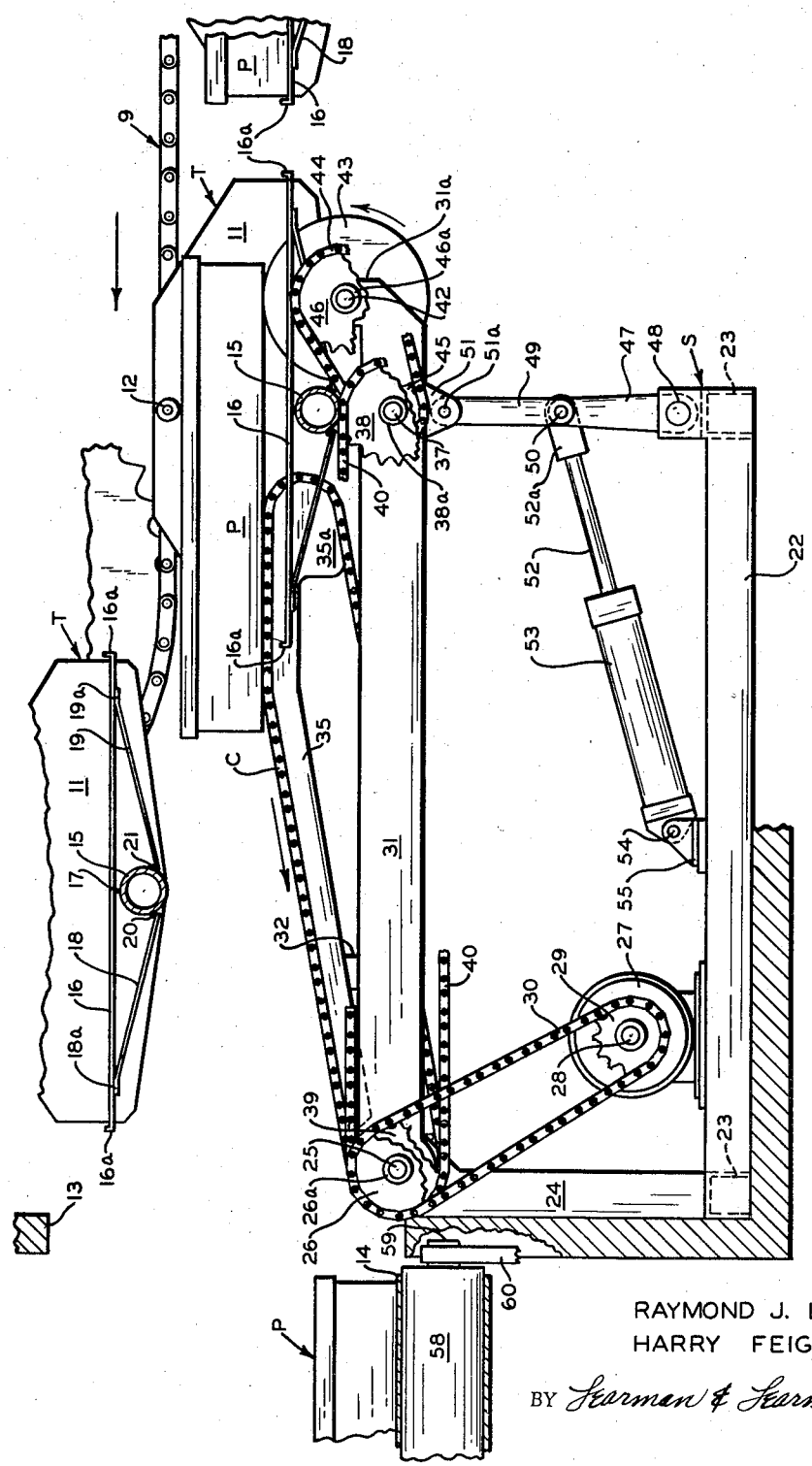
Fig. 2 is a view similar to Fig. 1 showing the stripper apparatus moved to operative position and discharging a pan set from one of the trays.

Rotatably mounted in a bearing 36 on the front end of one of the members 31 is a stub shaft 37 which has the hub 38a of a sprocket 38 secured thereon. A sprocket 39 having a hub 39a fixed to the shaft 25 drives the shaft 37 through a chain 40 trained around the sprockets 38 and 39. It will be observed that the members 31 extend forwardly of the shaft 37 and have ears 31a thereon supporting bearings 41. Journaled in the bearings 41 is a shaft 42 which has the hubs 43a of disc members 43 fixed thereon in spaced relation such that the discs 43 will be in longitudinal alignment with the sprockets 34 and guides 35. The shaft 42 is driven by a chain 44 which is trained around a sprocket 45 whose hub 45a is fixed to the shaft 37 and the sprocket 46 whose hub 46a is secured on the end of the shaft 42. The diameter of the discs 43 is such that the upper peripheral edges thereof are substantially on a level with the upper edges of the front ends 35a of the guides 35 when the members 31 are raised upwardly to operative position as in Fig. 2. The upper frame comprising the members 31 and 32 is connected to the lower frame or carriage by links 47 which are rigidly connected to a shaft 48 which is journaled between the rails 22 and links 49 which are pivotally connected to the links 47 at 50 and to ears 51 depending from the members 31 at 51a.

The piston rod 52 of a fluid pressure cylinder 53 which is pivotally supported at 54 on a platform 55 spanning the rails 22 has a bifurcated end 52a pivotally connected to a link 47a provided centrally on the shaft 48. Since both the links 47 and intermediate link 47a which is connected to the rod 52 are rigidly secured to the shaft 48, obviously the shaft 48 will be pivoted when the rod 52 moves outwardly, thus pivoting the links 49 and raising the upper frame.

In Fig. 4, we have shown an electrical control system which may be employed to operate the cylinder 53, the latter being preferably a single acting, pneumatic cylinder of common type with solenoids 54 and 55 for actuating a valve which either admits air to the inner end of the cylinder to move the rod 52 outwardly, or bleeds air therefrom so that the piston rod 52 can return to original position. Cylinders of this type having built-in solenoid-operated valves are commercially available and need no further description inasmuch as they are well known.

Mounted in the oven in the path of the trays as they approach the stripper apparatus is a limit switch 56 which, when tripped and closed, energizes the solenoid 54 and moves the valve in the cylinder to a position in which it admits air to the inner end of the cylinder so that the piston rod 52 is forced outwardly and the upper frame members 31 are raised. A second limit switch 57 mounted in the path of the tray at a point further along in its path of travel when the pans have been unloaded from the tray and the tray is about to be loaded once again will, when tripped and closed, energize the solenoid 55 and adjust the position of the valve so that air is bled from the cylinder. The weight of the upper frame and elements supported thereby will be sufficient to force the rod 52 inwardly when the air leaves the cylinder. The chains C are arranged to deliver the pans to the transverse conveyor belt which is shown trained around a roller 58 (Fig. 1), the roller having a shaft 59 supported in bearings such as at 60. This conveyor 14, of course, will be driven by a suitable drive arrangement to deliver the pan set to de-panning apparatus or the like.

In operation, the stripper apparatus is in lowered, inoperative position (see Fig. 1), as a given tray T approaches. When the limit switch 56 is tripped by the tray at a time when the shaft 15 of the tray is substantially over the front ends of the frame members 31, the piston rod 52 will be forced outwardly and the members 31 will be raised to the position shown in Fig. 2 in which the discs 43 are in front of the shaft 15 of the trays and the chains C are rearward thereof. The discs and chains move up between the rods 16 and lift the pan sets P from the trays as shown and convey them rearwardly to the conveyor 14. Since the front portions 35a of the guides 35 are approximately level with the upper peripheral edges of the discs 43 when the members 31 are substantially horizontal, sufficient chain surface is at once in engagement with the undersurfaces of the pans so that they are immediately carried rearwardly without any slippage. Further, the engagement is uniform and there is no skewing of the pans on the chains such that the pan sets will be improperly delivered to the conveyor 14 at an angle other than as shown. Just before the shaft of the continuously moving tray T is about to strike the chains C, the switch 57 is tripped and the apparatus immediately lowers out of their path to inoperative position once again.

The instant stripper apparatus lends itself particularly well to an operation in which independent superposed loading apparatus is to operate to reload the trays with pans containing proofed dough since it will operate to remove the pans prior to the time the trays have reached the limit of their travel in a longitudinal direction, thus providing the loading apparatus with ample time and space to reload the trays. Further, the stripper apparatus has not sufficient vertical travel to interfere with the operation of loading apparatus thereabove.

It is to be understood that the application of the apparatus disclosed is not to be in any way confined and that various changes may be made in the various elements of the invention without departing from the spirit of the invention or the scope of the subjoined claims. For example, suitably driven chain conveyors could in some instances replace the discs 43 and the air cylinder could, where practical, be vertically disposed and the linkage connecting its piston rod and the upper frame eliminated. The drawings and descriptive matter are in all cases to be interpretive as illustrating the invention rather than as limiting the scope of the invention in any way and for a determination of the scope of the invention, attention is directed to the claims which follow.

What we claim is:

1. In combination, a longitudinally moving tray having transversely spaced-apart, longitudinal members connected by a transverse member, the longitudinal members constituting a support surface for an article which spans at least a pair of said members, a frame, a file of conveyors disposed below said tray in longitudinal alignment with the spaces between the longitudinal members of said tray, a second file of conveyors on said frame in longitudinal alignment with said first mentioned conveyors, said second file of members being located a spaced distance from said first file of members, and means moving said files of conveyors upwardly between the longitudinal members of said tray with the first and second file of conveyors on opposite sides of the said transverse member of the tray to lift the article from said tray and transport it away from said tray, said means also operating to return said files to original position.

2. In combination, a pivotally mounted, longitudinally disposed frame, a longitudinally traveling grid type tray having transversely spaced-apart, longitudinal rods constituting a support surface for an article which spans at least two of said rods, transversely extending means connecting said rods, relatively narrow, longitudinally disposed conveyors mounted on said frame in transversely spaced relation and in vertical alignment with the spaces between said rods of the tray when the tray and conveyors are in juxtaposition, discs mounted on said frame in longitudinal alignment with said conveyors but a spaced distance therefrom, means for pivoting said frame upwardly in a vertical plane to raise said conveyors and discs up between said rods into engagement with the article, the conveyors and discs being disposed on opposite sides of the transverse means connecting the rods of the tray, said means also lowering said frame to original position, and means for simultaneously driving said conveyors and discs in a direction to move an article engaged thereby away from said tray.

3. In combination, a base, a longitudinally disposed frame having one end thereof pivotally connected to said base, means on said base adjustably supporting the opposite end of said frame, a grid type tray traveling in a path arranged to pass over said frame, the tray having longitudinally disposed rods connected by a central transverse shaft underneath said rods, longitudinally disposed, transversely spaced conveyor guides fixed on said frame and inclined upwardly from said frame, endless chain conveyors on said guides, discs on said frame a spaced distance from said conveyors in longitudinal alignment therewith, the conveyors and discs being in vertical alignment with the spaces between the rods of the tray when the tray is overhead so that the frame can be pivoted upwardly and the conveyors and discs brought up between the rods of the tray with the chain conveyors on one side of the transverse shaft of the tray and the discs on the other, said discs being of sufficient diameter so that the upper peripheries thereof are substantially on a horizontal level with the ends of the chain conveyors thereadjacent when the frame is pivoted to raised position, and means driving said conveyors and discs in a direction to move an article engaged thereby in a direction away from said tray.

4. The combination defined in claim 3 in which the ends of the said inclined guides adjacent said discs are flatted to provide a substantial conveyor surface disposed substantially level with the top of said discs when the frame is pivoted to its raised position.

5. The combination defined in claim 3 in which said discs are outward of said conveyors from the axis of pivot of said frame.

6. In combination, a base having transversely spaced end members, a transverse shaft journaled in said members, a longitudinally disposed frame pivotally mounted on said shaft to extend forwardly therefrom over said base, means supporting the front end of said frame operable to raise the same about the shaft, a grid type tray traveling in a longitudinal path passing over said frame and thence passing upwardly, said tray having a plurality of longitudinally disposed rods connected by a centrally disposed, continuous shaft secured underneath said rods, transversely spaced-apart sprockets fixed on said first-mentioned shaft in vertical alignment with the spaces between said rods when the tray is overhead, elongated chain guides secured to said frame forwardly of said sprockets and in longitudinal alignment therewith, said guides being inclined upwardly and forwardly relative to the rear of the frame and formed with flatted upper front ends, a drive shaft spanning the front of said frame, endless chain conveyors trained around said sprockets and guide, discs fixed on said drive shaft in longitudinal alignment with said chain conveyors, the discs being of sufficient diameter so that the upper peripheries thereof are substantially on a horizontal level with the uppermost portions of the chain conveyors when the frame is in raised position, means timing the operation of the means supporting the front end of the frame to raise the frame so that the chain conveyors and discs straddle the transverse shaft of the tray when the frame is raised and the conveyors and discs lift an article from the tray, and means driving the shafts supporting the sprockets and discs in a direction to convey the article away from the tray longitudinally as the tray moves upwardly.

7. In a stripper apparatus for removing articles from a carrier having spaced-apart members forming an article supporting surface joined by an intermediate shaft, a pivotally supported frame having a front end adapted to extend under the carrier, a plurality of transversely spaced, belt-type, endless conveyors mounted on said frame at an upwardly inclined angle relative thereto, a plurality of discs on said frame forward of said endless conveyors and in longitudinal alignment therewith, means for driving said conveyors and discs, and means for raising the front end of the frame about its axis of pivot and bringing said conveyors and discs up between the members of said carrier on opposite sides of the said intermediate shaft into engagement with an article on the carrier and for lowering the same when the discs and conveyors have removed the article from the vicinity of the carrier.

8. In stripper apparatus for removing pans from a longitudinally moving tray comprising transversely spaced-apart, longitudinally disposed rods joined by a centrally disposed shaft secured underneath the rods, a base frame having transversely spaced rear end members, a transverse shaft journaled between the upper ends of said members, a longitudinally disposed upper frame pivotally mounted on said shaft to extend forwardly over said base frame, a pressure fluid cylinder normally supporting the front end of said upper frame below horizontal position operable when pressure fluid is admitted thereto to raise the said upper frame to a substantially horizontal position, transversely spaced sprockets fixed on the shaft journaled between the end members of the base frame, elongated chain guides secured on said upper frame forwardly of said sprockets and in longitudinal alignment therewith, said guides being inclined upwardly and forwardly from the rear end of said upper frame and having arcuate front ends formed with upper edges generally parallel with the upper frame, endless chain conveyors trained around said sprockets and guides, a drive shaft spanning the front of said upper frame, discs mounted on said shaft in longitudinal alignment with said chain conveyors, the upper edges of the discs being in substantially horizontal alignment with the portions of the chain conveyors disposed over the upper edges of the front ends of said guides when the upper frame is moved to raised position between the rods of said tray with the chain conveyors and discs straddling the transverse shaft of said tray, and means driving the shafts journaled in the base frame and upper frame respectively to remove an article on said tray.

9. In combination; a pan carrying member having transversely spaced apart, substantially parallelly arranged pairs of longitudinally spaced openings therein constituting a support surface for an article which spans a plurality of said transversely adjacent pairs of openings; support means; a file of conveyors supported by said support means below said member in longitudinal alignment with the said pairs of openings; a second file of conveyors supported in longitudinal alignment with said first file of conveyors but at a spaced longitudinal distance therefrom at least as great as the distance between the longitudinally spaced openings in said pan carrying member; and means moving said files of conveyors upwardly into the spaces in said member with the first and second file of conveyors in the longitudinally spaced openings of the pairs of openings to lift the article from said member and transport it away from said tray; said means also operating to return said files of conveyors to original position.

10. In combination; a frame; a file of transversely spaced longitudinally extending conveyors supported on said frame; a grid type tray traveling in a continuous path having a longitudinal run passing over said file of conveyors and thence moving vertically; said tray having a plurality of longitudinally disposed, transversely spaced rods constituting a support surface for an article which spans at least a pair of said rods; said files being disposed in juxtaposed relation with said tray to be movable between said transversely spaced rods; support means; and raising and lowering means moving said frame and file of conveyors in a generally reciprocatory up and down path from a position underneath said tray through said tray to a position slightly above said rods, connected between said frame and support means; said means also being operable to return said file of conveyors in the same path of movement downwardly to original position.

11. The combination defined in claim 10 in which said raising and lowering means includes a fluid pressure cylinder for moving said frame and file of conveyors within the limits of its travel.

12. The combination defined in claim 10 in which pivotal link means secured between said support means and said frame supports said frame in the up and down positions.

References Cited in the file of this patent

UNITED STATES PATENTS

| | | |
|---|---|---|
| 847,147 | Arthur | Mar. 12, 1907 |
| 891,816 | Copland | June 30, 1908 |
| 1,963,314 | Savell et al. | June 19, 1934 |
| 1,969,122 | De Witt | Aug. 7, 1934 |
| 2,189,168 | Cook | Feb. 6, 1940 |
| 2,307,665 | Carmichael | Jan. 5, 1943 |
| 2,501,473 | Malvicini | Mar. 21, 1950 |
| 2,541,386 | Rundquist | Feb. 13, 1951 |